June 10, 1969     A. L. RENKEY     3,448,971
CARBON BAKING FURNACES
Filed Jan. 26, 1968
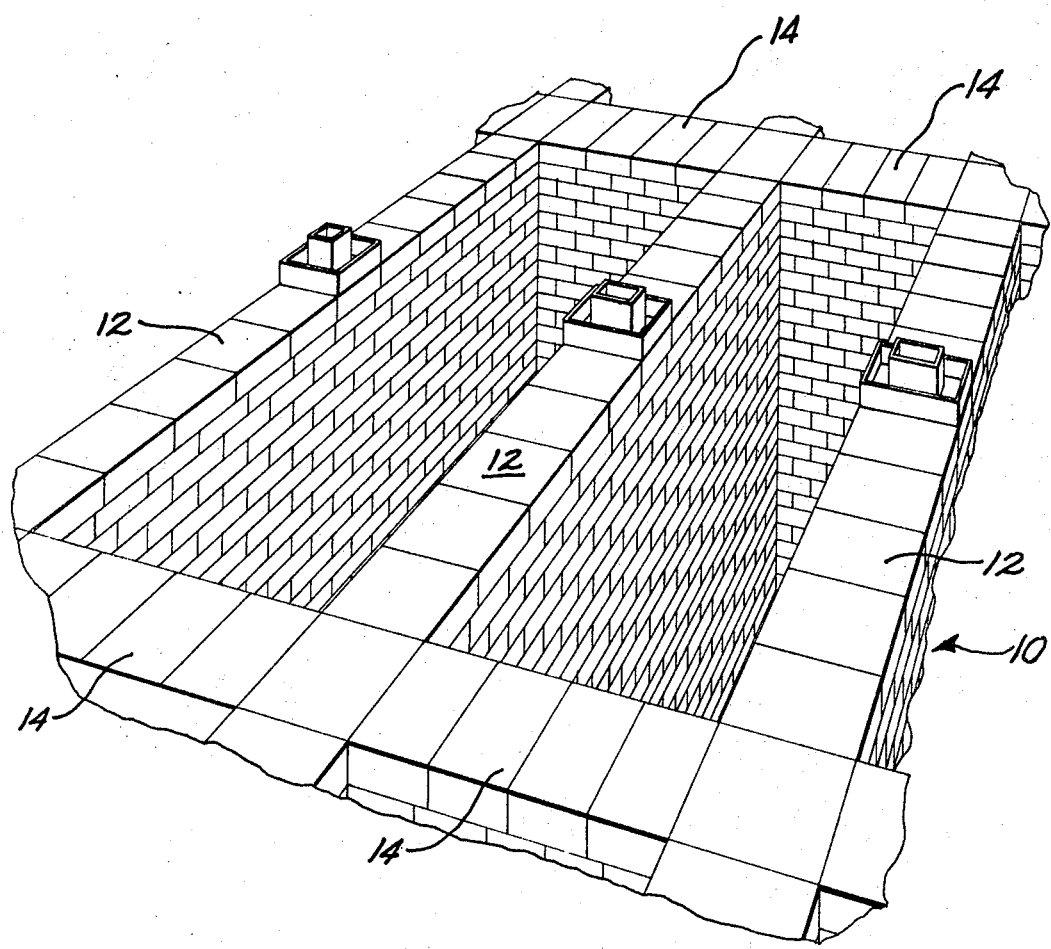
INVENTOR.
ALBERT L. RENKEY
BY
ATTORNEY

United States Patent Office

3,448,971
Patented June 10, 1969

3,448,971
CARBON BAKING FURNACES
Albert Lajos Renkey, Bethel Park, Pa, assignor to Dresser Industries, Inc., Dallas, Tex., a corporation of Texas
Filed Jan. 26, 1968, Ser. No. 700,983
Int. Cl. F27d *1/00;* F23m *5/00*
U.S. Cl. 263—46          9 Claims

ABSTRACT OF THE DISCLOSURE

Carbon baking furnace having a plurality of flues which are composed of burned alumino-silicate refractory brick of very low alkali content and linear subsidence.

---

The preparation of carbon anodes is an important phase in the efficient operation of the electrolytic aluminum reduction process. At plants using prebaked anodes, the most desirable physical and electrical characteristics are developed by the manufacturing procedures among which baking techniques are of major importance.

The carbon baking furnace is most commonly used for baking anodes in the aluminum industry. These furnaces are usually extremely large and the original construction often requires more than a million refractory and insulating firebrick, many of which are of special design to accomplish stable construction of the intricate flue system.

The baking of carbon anodes is accomplished in contiguous rectangular pits. The sidewalls, end walls and bottoms are constructed of refractory brick. The side walls embrace a series of flues in which the combustion of fuel takes place and through the side of which heat is transferred by conduction into the baking compartment. Green anodes formed on heavy presses are placed in the pits by mechanical means, along with loose coke to fill the spaces, and the anodes are baked largely by conduction, convection and radiation of heat from the side walls or firing flues.

Carbon baking furnaces are generally constructed of various types of fireclay brick, ranging in class from super duty to low duty, depending on the location in the furnace and severity of operation. The brick in firing flues are subjected to the most severe operating conditions and require the most maintenance. At present, super duty fireclay brick are used for flue construction in most furnaces. Some plants have used or are using hard burned super duty fireclay brick in the firing flues.

In most cases, the ultimate replacement of firing flues is necessitated by distortion of walls by bulging, which either constricts combustion space in the flue or interferes with the loading and unloading of the pits. This is one of the shortcomings of the fireclay brick known and used in the art. Such fireclay brick do not have the required resistance to subsidence to provide economical lining life in the carbon baking furnaces. In addition, since the anodes are baked primarily by conductive heat, it is necessary that the brick employed in the flues have a relatively high thermal conductivity. Known super duty fireclay brick having the other requisite properties for use in the flues of carbon baking furnaces, generally have a thermal conductivity of about 9 B.t.u./foot$^2$ hour-° F./ inch. It is desirable that the brick used in the flues have higher thermal conductivities.

Accordingly, it is an object of the present invention to provide an improved refractory lining for carbon baking furnaces.

Another object of the invention is to provide refractory brick for the flues of carbon baking furnaces having relatively low subsidence and relatively high thermal conductivity.

Other objects of the invention will, in part, become apparent hereinafter.

In order to more fully understand the nature and objects of he invention, reference should be had to the following detailed description and drawings, the single figure of which is an isometric view of a portion of a carbon baking furnace.

In accordance with the present invention, there is provided a carbon baking furnace consisting of a plurality of contiguous pits. The pits contain refractory side walls, end walls and bottoms. The side walls enclose a series of flues for the combustion of fuel. The side walls and a major portion of the flues are composed of ceramically bonded alumino-silicate brick having total alkalies analyzing less than about 0.5%, less than about 1% subsidence and no more than about 0.5″ sag at 2650° F. Further, the shapes are substantially free of vitrification (glassy phases).

According to one embodiment of the invention, a ceramically bonded brick is made from a batch consisting of a size graded alumino-silicate grog and bond clays. The fine fraction of the grog, that is, the —65 mesh portion, analyzes between about 40 and 60% $Al_2O_3$. The total alkali content of the bond clays used in the practice of this invention is less than 0.75%, preferably less than 0.5%, and typically less than 0.2% on a calcined basis. The total alkali content of the burned brick is generally less than 0.2%. The alumino-silicate grog, preferably, is calcined above about 2800° F. and the brick are burned above about 2800° F. Typically, the alumino-silicate grog comprises 70 to 90% of the batch and the bond clays comprise 10 to 30% of the batch. These brick subside less than about 1% in the 2600° F.-100 hour-load-test (defined hereafter).

In another embodiment of the present invention, ceramically bonded shapes are fabricated from a size graded refractory batch consisting of about 60% calcined bauxitic kaolin in the range —6 mesh to fines; about 25% calcined Alabama bauxite; and about 15 parts of very finely divided air floated ball clay. The calcined bauxitic kaolin can be mineralogically characterized as mullite, with an excess of silica. The silica is substantially all in the heat altered form, cristobalite. This mineralogical character is obtained by calcining the crude bauxitic kaolin material to a temperature in excess of 2900° F. and preferably at about 3050° F. Higher temperatures can be used as long as vitreous phases are not caused to form.

Broadly, these shapes consist of about 50 to 90% of calcined bauxitic kaolin, from 5 to 20% of very finely divided (air floated, preferably) ball clay, with the remainder being selected from the group consisting of calcined and crude aluminum ores, calcined and crude kaolin and alumina.

A better understanding and further features and advantages of the practice of this invention will become readily apparent to those skilled in the art by a study of the following detailed description and examples. It should, of course, be understood that these examples are given by way of explanation and not by way of limitation. All size gradings are according to the Tyler series, unless otherwise specified. All chemical analysis, unless otherwise specified, are on the basis of an oxide analysis in conformity with the conventional practice of reporting the chemical content of refractory materials. All analysis should be considered typical. All parts and percentages are by weight.

Examples 1 through 7 were prepared by mixing various bond clays and size graded refractory grog. The bond clays differed primarily in their total alkali content ($K_2O+Na_2O+Li_2O$) which ranged from 0.12 to 1.67% on a calcined basis. The mixes were all fabricated into brick in the same manner. The grog was first prepared by calcining at about 2800° F. Then, it was sized and graded so that when mixed with the bond clays the sizing of the total batch was from 10 to 20% +10 mesh, 20 to 30% −10 mesh +28 mesh, 10 to 20% −28 mesh +65 mesh, from 40 to 50% passing 65 mesh and from 35 to 45% passing 150 mesh. The bond clays were substantially all −150 mesh.

The size graded batches were tempered in a muller-type mixer with sufficient moisture to render the batch pressable (usually from 4.5 to 5.5%). The batches were pressed into brick at about 5500 p.s.i. The brick were dried at about 250° F. for at least 5 hours and thereafter burned or fired. The firing schedule was 100° per hour to 2800° F. with a 10 hour hold at the maximum temperature.

After cooling, the brick were submitted to a series of tests to determine their resistance to subsidence under load at 2600° F., alkali attack and thermal spalling. Standard physical and chemical properties were also determined. The results of these tests along with batch compositions are given in Table I.

both were composed of major mullite and minor cristobalite with very little amorphous material or glass being present. X-ray studies indicated substantially no glassy materials in Examples 1 and 2. The other examples made according to this invention would also be substantially free of glassy material.

The brick prepared according to the above examples had a typical thermal conductivity of about 13 B.t.u./ft.$^2$ hr.-° F./in., and a sag of about 0.02″ in the 2650° F. sag test. The resistance to sag is important because of the disposition of brick in carbon baking furnaces. Since the brick are disposed one above the other in an independent wall construction and heat is conducted through the walls, low sag resistance will cause the lower brick to crack and deteriorate. Fireclay brick previously used in these furnaces had a sag of about 0.17″. Accordingly for the purposes of this invention the brick employed in the side walls and flues of the carbon baking furnace should have a sag of no more than about 0.05″ at 2650° F. and certainly no more than 0.1″.

In the sag test, the brick samples were 9″ straights, each being supported on top of two refractory brick having an 8″ span therebetween. The samples are center loaded with one 9″ straight weighing about 10.5 lbs. and heated in a kiln to 2650° F. in an oxidizing atmosphere. The samples are held at this temperature for 10 hours, then cooled. The sag is expressed as being the difference between measurements before and after the test.

The typical chemical analysis of the alumino-silicate grogs used in the above examples is as follows: $SiO_2$, 52.0%; $Al_2O_3$, 44.9%; $TiO_2$, 1.6%; $Fe_2O_3$, 1.3%; CaO, 0.1%; MgO, 0.1%; and $Na_2+K_2O+LiO$, 0.10 to 0.20%.

The following is a chemical analysis of the bond clays on a calcined basis used in the examples in this specification.

TABLE I

| Example | 1 | 2 | 3 | 4 | 5 | 6 | 7 |
|---|---|---|---|---|---|---|---|
| Mix: | | | | | | | |
| Coarse and fine grog (45% $Al_2O_3$), percent | 85 | 85 | 85 | 80 | 85 | 75 | 85 |
| Bond clay, percent | 15 | 15 | 15 | 20 | 15 | 25 | 15 |
| Alkalies in bond clay, percent | 0.12 | 0.18 | 0.46 | 0.46 | 0.58 | 1.67 | 1.67 |
| Alkalies in burned brick, percent | 0.09 | 0.08 | 0.10 | 0.12 | 0.11 | 0.48 | 0.25 |
| Bulk density, p.c.f. (av. 20) [1] | 158 | 157 | 154 | 153 | 153 | 156 | 156 |
| Apparent porosity (av. 4),[2] percent | 9.1 | 9.4 | 9.8 | 10.3 | 10.7 | 9.8 | 9.6 |
| Percentage loss in panel spalling test with 3000° F. preheat: [3] | | | | | | | |
| Average 6 samples, percent | 0.4 | 0.6 | ([5]) | 1.6 | 2.8 | 4.5 | ([5]) |
| Range 6 samples, percent | 0–1.9 | 0–1.5 | ([5]) | 0.2–3.7 | 1.0–7.0 | 0.2–13.4 | ([5]) |
| Load test, 25 p.s.i., subsidence after 100 hours at 2600° F. (av. 2),[4] percent | 0.4 | 0.3 | 0.8 | 0.6 | 0.6 | 3.1 | 3.5 |
| Special alkali slag test | ([6]) | ([6]) | ([6]) | ([6]) | ([6]) | ([7]) | ([6]) |

[1] Standard Methods of Test for Size and Bulk Density of Refractory Brick, American Society for Testing Materials (ASTM). Designation C134–41 Manual of ASTM Standards on Refractory Materials, 9th edition, page 154 (1963).
[2] Standard Methods of Test for Apparent Porosity, ASTM Designation C20–46, ibid. page 159.
[3] Standard Method of Panel Spalling Test for Super Duty Fireclay Brick, ASTM Designation C122–52, ibid. page 62.
[4] Standard Method of Testing Refractory Brick Under Load at High Temperatures, ASTM Designation C16–62, ibid. page 127.
[5] Not run.
[6] No cracking.
[7] Slight cracking.

Table I establishes that the alkali content of bond clays used in this embodiment of the invention is very important because it affects the resistance to load, spalling resistance and alkali resistance. Mixes 1 through 5, according to this invention, subsided less than 1% in the 2600° F.-100 hour-25 p.s.i. load test, hereafter referred to as the long-time-load-test. Most prior known alumino-silicate brick subside between 2 and 8% in this test and none are known that subside less than 1%. The alumino-silicate brick, which until this time was considered superior to others in the long-time-load-test are referred to as mullite brick. Brick made according to this invention, i.e., the alkali content of the bond clays being less than about 0.75% are therefore superior to the best prior art brick. Notice that when the alkali content is less than about 0.2% the subsidence in the load test is less than 0.5%.

Mineralogical examination of Examples 1 and 2 showed

CHEMICAL ANALYSIS OF BOND CLAYS ON CALCINED BASIS

| Used in Examples | 5 | 1 | 2 | 7 | 4, 5 |
|---|---|---|---|---|---|
| Percent: | | | | | |
| $SiO_2$ | 61.4 | 52.9 | 52.8 | 54.8 | 61.4 |
| $Al_2O_3$ | 34.0 | 44.8 | 44.5 | 39.2 | 33.5 |
| $TiO_2$ | 1.8 | 1.7 | 1.7 | 1.9 | 2.1 |
| $Fe_2O_3$ | 1.6 | 0.5 | 0.7 | 1.5 | 1.1 |
| CaO | 0.16 | 0.27 | 0.3 | 0.43 | 0.33 |
| MgO | 0.35 | 0.19 | 0.18 | 0.48 | 0.33 |
| $NaO_2$ | 0.07 | 0.05 | 0.11 | 0.09 | 0.08 |
| $K_2O$ | 0.48 | 0.05 | 0.05 | 1.48 | 0.36 |
| $L_2O$ | 0.03 | 0.02 | 0.02 | 0.10 | 0.02 |
| | 0.58 | 0.12 | 0.18 | 1.67 | 0.46 |

Example 8

About 85 parts of calcined bauxitic kaolin, −6 mesh to ball mill fines, and about 15 parts of air floated ball clay were dry mixed for about five minutes—then for an additional five minutes with about 5% water, based on the total weight of the dry solids in the batch. The calculated alumina content of this batch was about 54%. Shapes were made from this batch according to conventional power pressing techniques, at a pressure of about 4000 p.s.i. The shapes were dried overnight at room temperature (72° F.) and then for an additional 24 hours in an atmosphere of about 250° F. The dried shapes were fired to 2600-2650° F.

The fired shapes, after cooling, were subjected to physical testing. The shapes had an average density of 155 p.c.f. The modulus of rupture averaged 1630 p.s.i. The apparent porosity was only 15.5%. In an ASTM spalling test, in which the shapes were heated to 3000° F. and then cooled to room temperature and thereafter subjected to rapid cycling between about 2500° F. and about 500° F. to impose severe thermal shock on the shapes, there was no loss. In the ASTM load test at 2640° F., under a 25 p.s.i. load for 90 minutes, the brick had an average linear subsidence of only 0.8%.

itic kaolin material to obtain satisfactory high alumina refractory products. However, as with the crude kaolin, this material should substantially all pass at least a 100 mesh screen.

In all of the batches discussed above, Examples 8, 9 and 10, substantially the same size grading was maintained. The size grading was typically as follows: 6 on 10 mesh, 10–15%; −10 on 28 mesh, 24–30%; −28 on 65 mesh, 13–17%; the remainder passing a 65 mesh screen. Over 50% of the −65 mesh fraction was comprised of other than the calcined bauxitic kaolin.

The preferred mixes according to this embodiment of the invention consist of about 50 to 70% calcined bauxitic kaolin, −6 mesh to ball mill fines; 5 to 20% of ball clay, all of which passes a 150 mesh screen; the remainder being calcined Alabama bauxite, most of which (70% or more, by weight) passes a 150 mesh screen. A preferred specific mix, with which excellent results have been obtained, is that set forth in Example 10 above.

Typical chemical analyses of the materials used in the above examples are as follows:

TABLE III

|  | Calcined Alabama bauxite, percent | Calcined kaolin, percent | Crude kaolin, percent | Crude bauxite, percent | Air floated ball clay, percent | Calcined bauxitic kaolin, percent |
|---|---|---|---|---|---|---|
| Silica ($SiO_2$) | 21.3 | 52.0 | 44.8 | 15.5 | 62.9 | 37.4 |
| Alumina ($Al_2O_3$) | 75.0 | 44.9 | 38.7 | 54.6 | 30.9 | 59.9 |
| Titania ($TiO_2$) | 2.6 | 1.6 | 1.4 | 1.9 | 1.4 | 2.0 |
| Iron oxide ($Fe_2O_3$) | 1.1 | 1.3 | 1.1 | 0.8 | 2.6 | 0.9 |
| Lime (CaO) | 0.1 | 0.1 | 0.1 | 0.1 | 0.6 | 0.03 |
| Magnesia (MgO) | Tr. | 0.1 | 0.1 | Tr. | 0.8 | 0.03 |
| Alkalies | 0.1 | 0.3 | 0.3 | 0.1 | 0.8 | 0.05 |
| Ignition loss |  |  | 13.9 | 27.2 |  |  |

Example 9

About 85 parts of calcined bauxitic kaolin, −6 mesh to fines, was mixed with 15 parts of crude kaolin, substantially all of which was −65 mesh and with 85% thereof passing a 150 mesh screen. The calculated alumina content for this mixture was about 56%. Brick were made from this batch using the same technique set forth in Example 8. The average density for the resulting brick was 154 p.c.f. Modulus of rupture averaged 1620 p.s.i. The apparent porosity was 16.7%, somewhat higher than for Example 8. In an ASTM spalling test, similar to that discussed under Example 8, no loss occurred. Linear subsidence in the load test was only 0.9%.

Example 10

About 60 parts of calcined bauxitic kaolin, −6 mesh including fines; 25 parts of calcined Alabama bauxite, ball mill fines (nominally 70% −150 mesh); and about 15 parts of air floated ball clay, were mixed with about 4 parts, by weight, of water (based on the total weight of the dry solids in the batch). This batch was manufactured into shapes using substantially the same techniques (excepting an 8000 p.s.i. forming pressure was used) as set forth under Example 8 above. These shapes were burned at 2680° F. In physical testing, these shapes had an average modulus of rupture of 2450 p.s.i. The density was 159 p.c.f. and the porosity was only 13.8%. The calculated alumina content of this mixture was about 60%. In the ASTM panel spalling test, no loss occurred. In the 2640° F. load test, only 0.6% subsidence was measured.

Example 10 testing indicated that calcined bauxitic kaolin could be inter-mixed with calcined bauxite and ball clay to produce very good high alumina shapes. In fact, observing the modulus of rupture, density and porosity, they were superior to the batches of Examples 8 and 9. Some improvements in properties, of course, resulted from the higher firing temperature and forming pressure.

Additional studies were undertaken which determined that crude bauxite could be used with our calcined bauxitic kaolin material to obtain satisfactory high alumina refractory products.

Fired shapes according to this invention are characterized by substantially true mineral homogeneity, through both the grain and the matrix, i.e., both the grain and the matrix are mullite, with an excess of silica. The silica is in the heat-altered form, cristobalite. Further, since the total alkali content of the batch is kept below about 1%—and preferably below 0.5%, there is substantially no vitrification and, microscopically, the brick components are crystalline. While the excess silica is substantially all in the form of cristobalite, some residual quartz can be detected. Some residual corundum ($Al_2O_3$) can be detected.

Brick prepared according to the above examples (8, 9 and 10) had a typical thermal conductivity of about 14 B.t.u/ft.$^2$/hr.—° F./in. and a sag of about 0.04" in the 2650° F. sag test.

Referring to the drawing, there is shown a portion 10 of a carbon baking furnace. The portion 10 illustrates two of the firing pits. Actually some furnaces have as many as 360 pits. The individual pits are usually grouped in sections of six pits each and, inasmuch as adjacent pits have common side walls 12, each section contains 5 inside firing flues and 2 outside flues. The pits in other sections are separated by end walls 14. The side walls and flues embraced thereby are fabricated from the refractory shapes of the composition set forth hereinbefore.

Having thus described the invention in detail and with sufficient particularity as to enable those skilled in the art to practice it, what is desired to have protected by Letters Patent is set forth in the following claims.

I claim:

1. A carbon baking furnace consisting of a plurality of contiguous pits, said pits having side walls, end walls and a bottom, said side walls enclosing a series of flues for the combustion of fuel, said side walls and flues being composed of ceramically bonded alumino-silicate brick having total alkalies analyzing less than 0.5% and having no more than about 0.1" sag at 2650° F., said shapes being substantially free of vitrification.

2. Furnace according to claim 1 in which the brick are made from a size graded batch having a coarse and fine fraction, said brick comprised of an alumino-silicate grog and bond clays, said bond clays analyzing up to about 0.75% alkalies, said grog in the fine fraction analyzing between about 40 and 60% $Al_2O_3$.

3. Furnace according to claim 2 in which the bond clays analyze up to about 0.5% alkalies.

4. Furnace according to claim 2 in which the alumino-silicate grog is calcined above 2800° F. and the brick is burned at about 2800° F.

5. Furnace according to claim 2 in which the grog in the fine fraction analyzes typically 45% alumina.

6. Furnace according to claim 2 in which the grog comprises from 70 to 90% of the batch and the bond clay comprises from 10 to 30% of the batch.

7. Furnace according to claim 1 in which the brick are made from a size graded refractory batch consisting essentially of, by weight, 50 to 90% calcined bauxitic kaolin, the remainder being material selected from the group consisting essentially of finely divided calcined and crude aluminum ores, finely divided calcined and crude kaolin, and finely divided ball clay, the selected material substantially all passing a 100 mesh screen, said shape being microscopically crystalline, and characterized by substantially true mineral homogeneity.

8. Furnace according to claim 1 in which the brick have a sag of no more than about 0.05" at 2650° F.

9. Furnace according to claim 7 in which the brick are made from a batch consisting of 50 to 70% calcined bauxitic kaolin, 5 to 20% air floated ball clay, both by weight and based on the total weight of the batch, the remainder being calcined bauxite.

References Cited

UNITED STATES PATENTS

| | | | |
|---|---|---|---|
| 1,929,073 | 10/1933 | MacDonald | 263—46 X |
| 2,186,223 | 1/1940 | Willetts | 263—46 |
| 2,480,359 | 8/1949 | Debenham | 263—46 |
| 2,704,419 | 3/1955 | Hewitt et al. | 263—46 |
| 3,048,382 | 8/1962 | Mansfield | 263—41 |
| 3,240,479 | 3/1966 | Shea et al. | 263—41 |

JOHN J. CAMBY, *Primary Examiner.*

U.S. Cl. X.R.

263—41